United States Patent [19]

Kanamaru et al.

[11] Patent Number: 5,063,886
[45] Date of Patent: Nov. 12, 1991

[54] TWO-STROKE ENGINE

[75] Inventors: Masanobu Kanamaru, Susono; Norihiko Nakamura, Mishima; Toshio Tanahashi, Sunono; Yoshio Kido, Gotenba; Toshio Ito; Katsuhiko Hirose, both of Susono, all of Japan

[73] Assignee: Toyota Jidosha Kabushiki Kaisha, Aichi, Japan

[21] Appl. No.: 575,660

[22] Filed: Aug. 31, 1990

[30] Foreign Application Priority Data

Sep. 18, 1989 [JP] Japan .................................. 1-240153
Sep. 20, 1989 [JP] Japan .................................. 1-241831

[51] Int. Cl.⁵ .......................................... F02B 75/02
[52] U.S. Cl. ............................. 123/65 VD; 123/73 C; 123/299; 123/463
[58] Field of Search ................. 123/73 A, 73 C, 73 B, 123/463, 299, 300, 65 VD

[56] References Cited

U.S. PATENT DOCUMENTS

| | | | |
|---|---|---|---|
| 4,377,145 | 3/1983 | Nagaishi | 123/463 |
| 4,411,235 | 10/1983 | Shinoda et al. | 123/463 |
| 4,414,940 | 11/1983 | Loyd | 123/299 |
| 4,616,605 | 10/1986 | Kline | 123/65 VD |
| 4,753,213 | 6/1988 | Schlunke et al. | 123/73 C |
| 4,763,626 | 8/1988 | Staerzl | 123/73 A |
| 4,790,270 | 12/1988 | McKay et al. | 123/73 C |
| 4,829,964 | 5/1989 | Asayama | 123/463 |
| 4,840,147 | 6/1989 | Tanahashi et al. | 123/65 VD |
| 4,872,437 | 10/1989 | Asayama | 123/463 |
| 4,957,089 | 9/1990 | Morikawa | 123/65 BA |
| 4,960,097 | 10/1990 | Tachibana et al. | 123/73 A |

FOREIGN PATENT DOCUMENTS

| | | | |
|---|---|---|---|
| 57-38662 | 3/1982 | Japan . | |
| 58-217730 | 12/1983 | Japan . | |
| 60-5770 | 2/1985 | Japan . | |
| 60-36719 | 2/1985 | Japan . | |
| 63-173814 | 7/1988 | Japan | 123/65 PE |
| 63-230920 | 9/1988 | Japan . | |
| 64-13263 | 1/1989 | Japan . | |
| 64-13264 | 1/1989 | Japan . | |
| 64-13265 | 1/1989 | Japan . | |
| WO87/00579 | 1/1987 | PCT Int'l Appl. . | |
| WO90/00222 | 1/1990 | PCT Int'l Appl. . | |

Primary Examiner—David A. Okonsky
Attorney, Agent, or Firm—Oliff & Berridge

[57] ABSTRACT

A two-stroke engine having an intake valve and an exhaust valve arranged on an inner wall of the cylinder head, an intake passage connected to the cylinder via the intake valve, a fuel injection device arranged in the cylinder, for injecting fuel into the cylinder, a pressure regulator for regulating a fuel pressure supplied to the fuel injection device on the basis of a scavenging pressure in the intake passage, to thereby increase the fuel pressure in accordance with an increase of the scavenging pressure, and a control device for controlling the injection of fuel by the fuel injection device for a time ranging from a time at which the intake valve is opened to a time at which the scavenging pressure becomes equal to a pressure in the cylinder after the intake valve is closed.

15 Claims, 15 Drawing Sheets

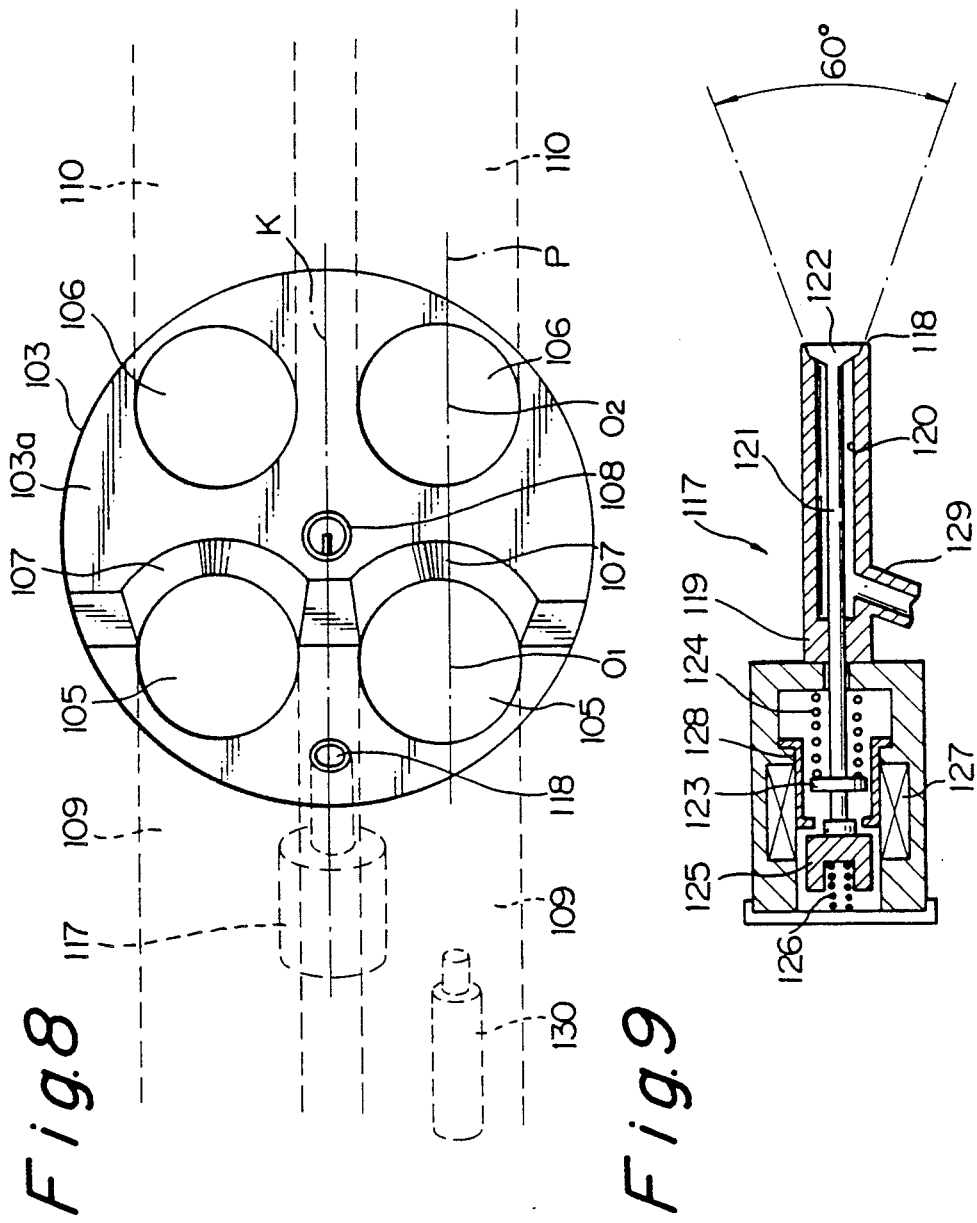

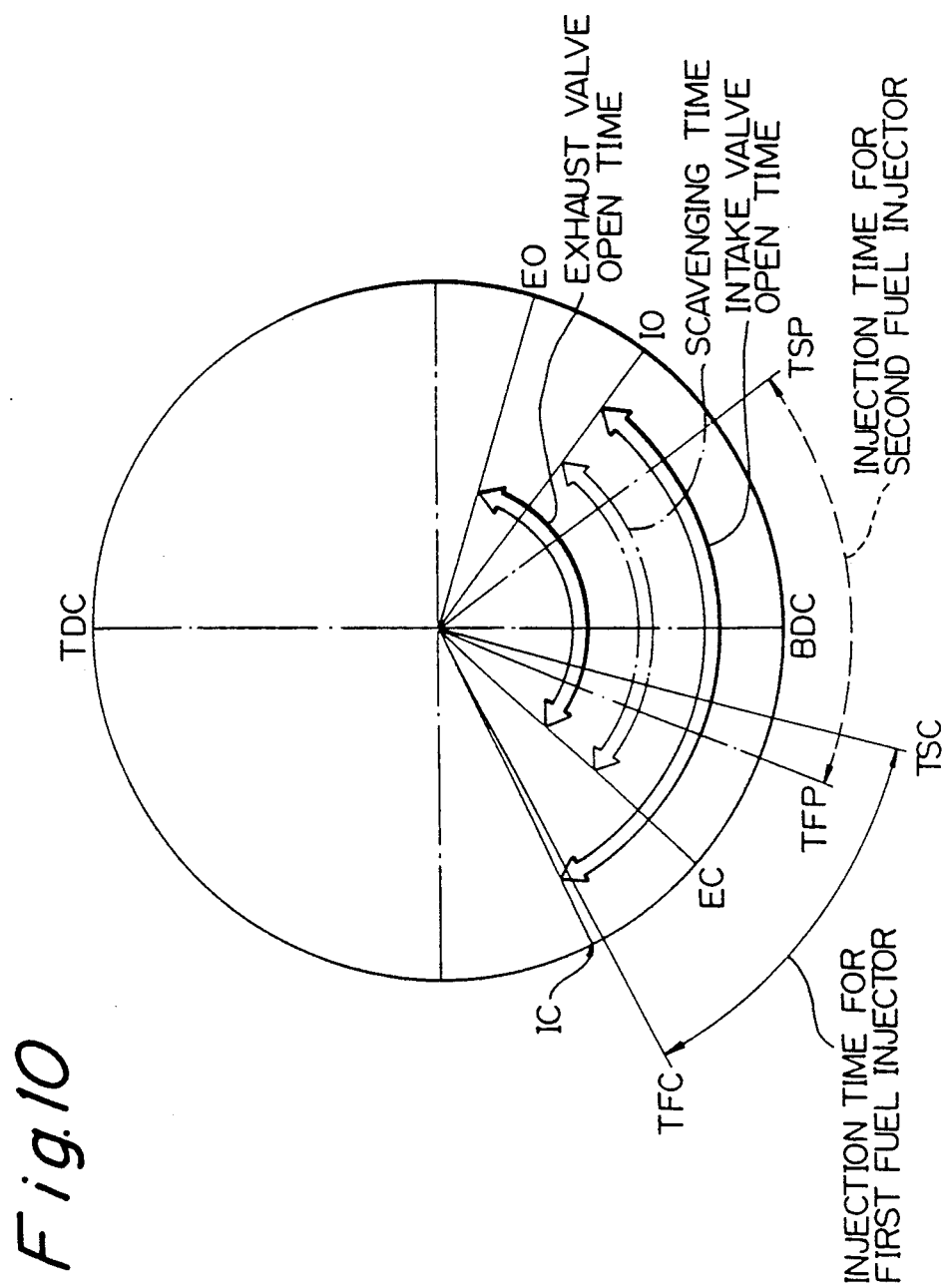

TWO-STROKE ENGINE

BACKGROUND OF THE INVENTION

1. Field of the Invention

The present invention relates to a two-stroke engine.

2. Description of the Related Art

In a fuel injector whereby fuel is injected to a cylinder by a fuel pressure and the amount of fuel to be injected is controlled by an injection time, when a pressure differential between the fuel pressure and a pressure in the cylinder fluctuates, the amount of fuel to be injected cannot be precisely controlled.

Therefore, Unexamined Patent Publication No. 58-217730 proposed a method of controlling the amount of fuel injected to a diesel engine. In this method, in a fuel injection control device for a diesel engine, in which the control of the amount of injected fuel is carried out by controlling the fuel pressure, the pressure in the cylinder during the fuel injection is detected by a pressure sensor and the fuel pressure is controlled in accordance with the pressure detected in the cylinder, and thus any fluctuation of the amount of injected fuel due to a fluctuation of the pressure in the cylinder is prevented.

In this method, however, the pressure sensor, etc., must be used, and thus a problem arises in that the device is complicated.

SUMMARY OF THE INVENTION

An object of the present invention is to provide a two-stroke engine in which the amount of injected fuel is precisely controlled by a simple construction.

Therefore, according to the present invention, there is provided a two-stroke engine having a cylinder and a cylinder head: the engine comprising an intake valve and an exhaust valve arranged on an inner wall of the cylinder head; an intake passage connected to the cylinder through the intake valve; fuel injection means arranged in the cylinder, for injecting fuel into the cylinder; a pressure regulator for regulating a fuel pressure supplied to the fuel injection means, on the basis of a scavenging pressure in the intake passage, to increase the fuel pressure in accordance with an increase of the scavenging pressure; and control means for controlling the injection by the fuel injection means, to thereby inject fuel for a period ranging from a time at which the intake valve is opened to a time at which the scavenging pressure becomes equal to a pressure in the cylinder after the intake valve is closed.

The present invention may be more fully understood from the description of preferred embodiments of the invention set forth below, together with the accompanying drawings.

BRIEF DESCRIPTION OF THE DRAWINGS

In the drawings:

FIG. 8 is a view illustrating the inner wall of the cylinder head shown in FIG. 7;

FIG. 9 is a cross-sectional side view of a first fuel injector;

FIG. 10 and FIG. 11 are diagrams illustrating the injection times of the fuel injectors;

DESCRIPTION OF THE PREFERRED EMBODIMENTS

Figure 1:
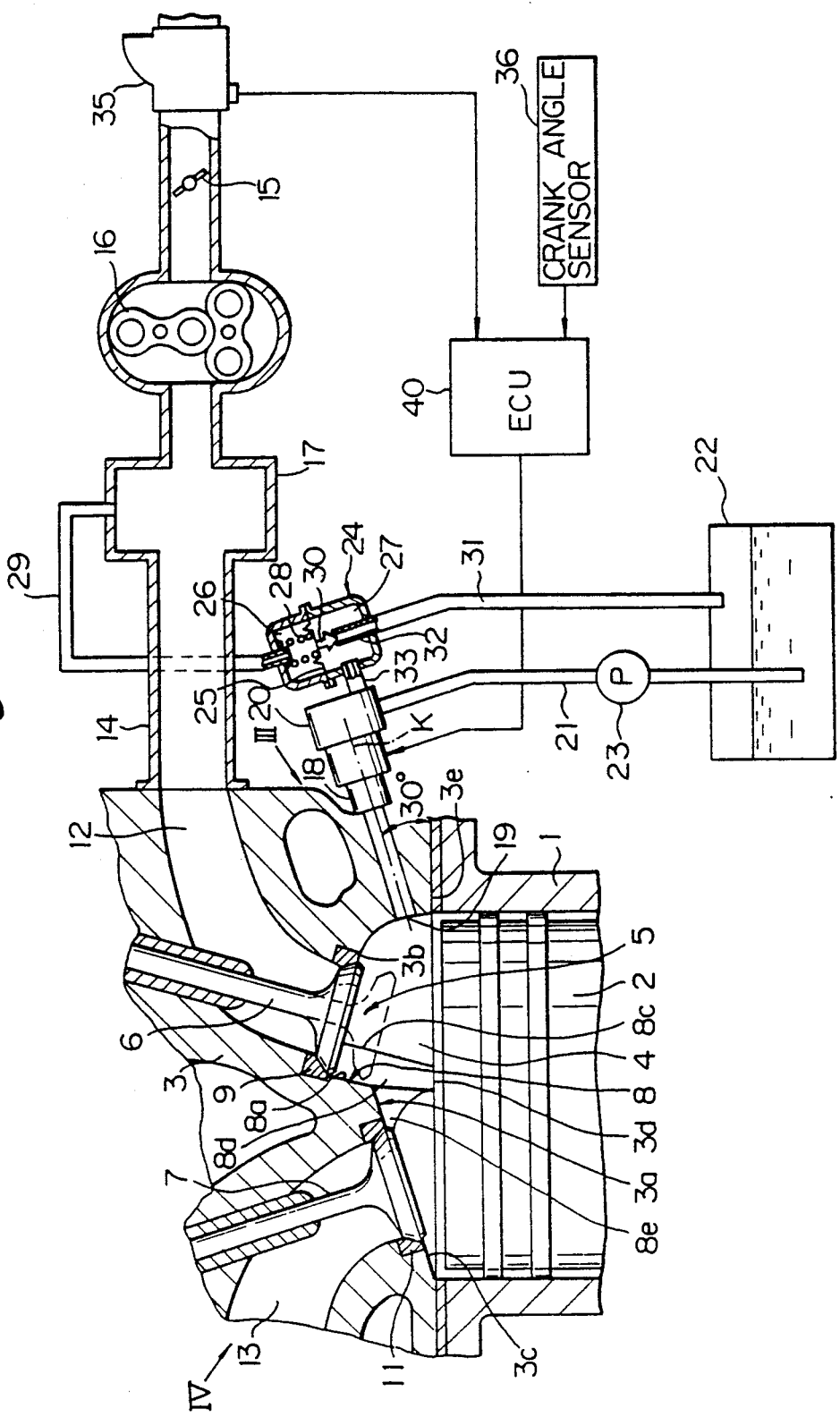
FIG. 1 is a cross-sectional side view of a two-stroke engine of a first embodiment according to the present invention.
Figure 2:
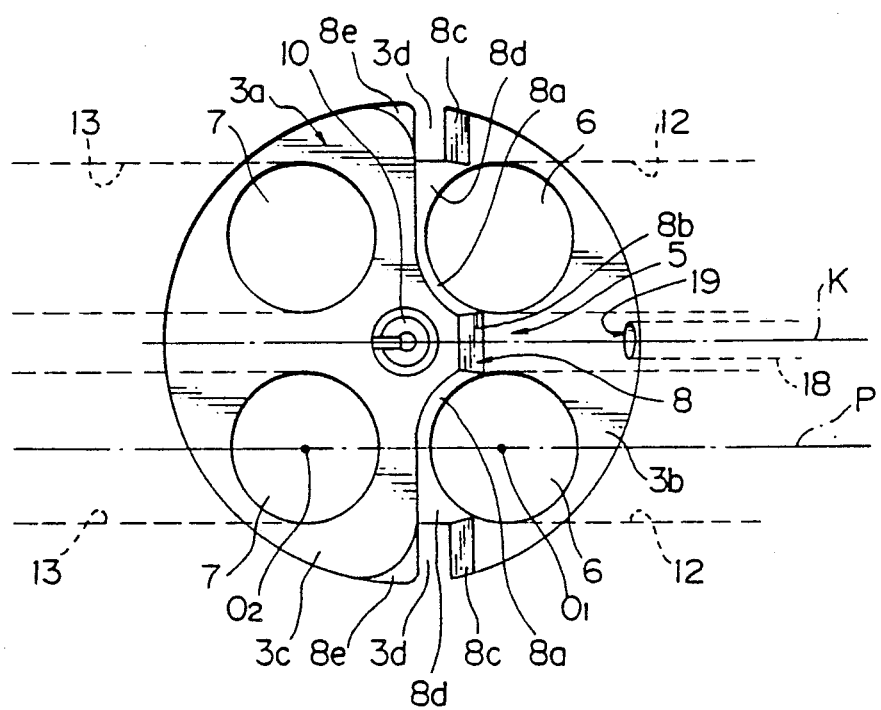
FIG. 2 is a view illustrating the inner wall of the cylinder head shown in FIG. 1.
Figure 3:
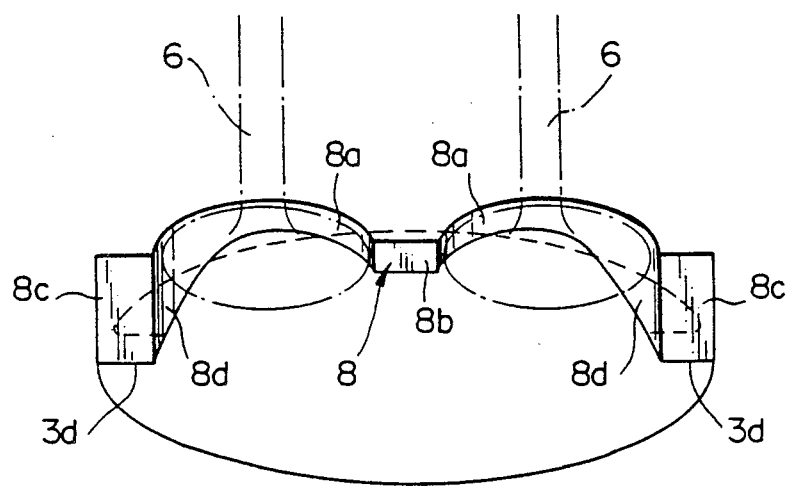
FIG. 3 is a diagrammatical perspective view taken along the line of an arrow III in FIG. 1.
Figure 4:
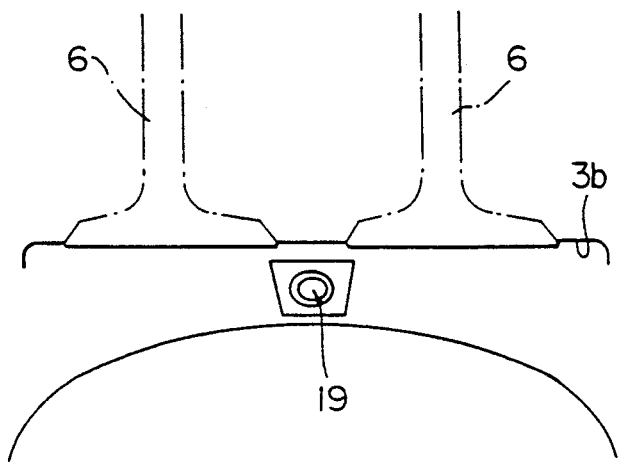
FIG. 4 is a diagrammatical perspective view taken along a line of an arrow IV in FIG. 1.

Hereinafter a first embodiment of the present invention is explained with reference to FIGS. 1 through 4, wherein 1 designates a cylinder block, 2 a piston reciprocally movable in the cylinder block 1, 3 a cylinder head fixed to the cylinder block 1, and 4 a combustion chamber formed between the inner wall 3a of the cylinder head 3 and the top face of the piston 2. A depression 5 is formed on inner wall 3a of the cylinder head 3, and a pair of intake valves 6 are arranged on the inner wall portion 3b of the cylinder head 3, which forms the bottom wall of the depression 5. Other than at the depression 5 of the inner wall portion 3c, the cylinder head 3 is substantially flat, and a pair of exhaust valves 7 are arranged on this inner wall portion 3c of the cylinder head 3. The inner wall portions 3b and 3c of the cylinder head 3 are interconnected via the peripheral wall 8 of the depression 5. The peripheral wall 8 of the depression 5 comprises a pair of masking walls 8a arranged as close as possible to the peripheral portions of the corresponding intake valves 6 and extending in an arc along the periphery of the corresponding intake valves 6, a fresh air guide wall 8b arranged between the intake valves 6, and a pair of fresh air guide walls 8c each arranged between the cylinder head 3 and the corresponding intake valve 6. The masking walls 8a extend toward the combustion chamber 4 to a position below the intake valves 6 when the valves 6 are in the maximum lift position, as shown by a broken line in FIG. 1, and thus the valve opening between the valve seat 9 and the peripheral portion of the intake valve 6, which is located on the exhaust valve side, is masked by the corresponding masking wall 8a for the entire time for which the intake valve 6 is open. A pair of the fresh air guide walls 8b are located on substantially the same plane, and the fresh air guide walls 8b and 8c extend substantially in parallel to the line passing through the centers of the intake valves 6. Also, a pair of the fresh air guide walls 8c extend to the bottom wall of the inner wall 3a of the cylinder head 3. Namely, the bottom wall of the inner wall 3a of the cylinder head 3 has a pair of bottom wall portions 3d protruding toward the combustion chamber 4 in a U shape, and the fresh air guide walls 8c extend from the inner wall portion 3b of the cylinder head 3 to the bottom wall portion 3d. Accordingly, the fresh air guide wall 8c is higher than the masking wall 8a. The masking wall 8a, which is located on the fresh air guide wall 8c side, has a prolonged portion 8d extending to the bottom wall portion 3d, and the prolonged portion 8d also forms a fresh air guide wall. As shown in FIG. 3, the fresh air guide wall 8d extends to the fresh air guide wall 8c in a curved shape, and the fresh air guide wall 8d becomes higher as it becomes nearer to the fresh air guide wall 8c. As shown in FIGS. 1 and 2, combustion gas guide walls 8e are formed opposite to the fresh air guide walls 8c. The combustion gas guide wall 8e is formed by a curved face extending from the inner wall portion 3c of the cylinder head 3 to the bottom wall portion 3d.

As shown in FIG. 2, the spark plug 10 is arranged on the inner wall portion 3c of the cylinder head 3 in such a manner that it is located at the center of the inner wall 3a of the cylinder head 3. When the exhaust valve 7 is opened, the entire valve opening between the valve seat 11 and the peripheral portion of the exhaust valve 7 is opened to the combustion chamber 4.

As shown in FIG. 1, intake ports 12 are formed in the cylinder head 3 for the intake valves 6, and exhaust ports 13 are formed in the cylinder head 3 for the exhaust valves 7. The intake ports 12 are connected to an intake pipe 14, and an air flow meter 35, a throttle valve 15, a mechanically driven supercharger 16, and a surge tank 17 are arranged in the intake pipe 14, in this order from an upstream side thereof. The supercharger 16 compresses and feeds fresh air into the combustion chamber 4, and accordingly, a scavenging pressure is supplied to the intake pipe 14 downstream of the supercharger 16 and the intake ports 12, by the supercharger 16, and fresh air is introduced into the combustion chamber 4 by the scavenging pressure. A fuel injector 18 is arranged at the peripheral portion of the inner wall portion 3b of the cylinder head 3 downward of the intake valves 6. The fuel injector 18 and the masking wall 8a are located on an opposite side with respect to the intake valve 6, and a nozzle opening 19 is formed at the tip of the fuel injector 18. The nozzle 19 is arranged in the combustion chamber 4, and the rear end of the fuel injector 18 is connected to a fuel delivery pipe 20, which is connected to a fuel tank 22 via a fuel supply pipe 21, and a fuel pump 23 is arranged in the fuel supply pipe 21. A pressure regulator 24 is provided in the fuel delivery pipe 20, and comprises a spring chamber 26 and a fuel chamber 27 divided by a diaphragm 25, and a compression spring 28 arranged in the spring chamber 26 to forcibly move the diaphragm 25. The spring chamber 26 is connected to the surge tank 17 via a pressure conduit 29, whereby the pressure in the surge tank 17 is introduced into the spring chamber. The fuel chamber 27 is connected to the delivery pipe 20 via a communication pipe 33, and thus fuel in the delivery pipe 20 is introduced into the fuel chamber 27. A valve body 30, which extends into the fuel chamber 27, is arranged at the center of the diaphragm 25, and a fuel return conduit 31, which connects the fuel chamber 27 to the fuel tank 22, protrudes into the fuel chamber 27. The opening 32 of the fuel return conduit 31 in the fuel chamber 27 is opened and closed by the valve body 30. The opening 32 is opened when the fuel pressure in the fuel chamber 27 becomes higher than the pressure in the spring chamber, by a predetermined pressure, and fuel in the fuel chamber 27 is returned to the fuel tank 22 via the fuel return conduit 31. Therefore, the fuel pressure in the fuel delivery pipe 20 is controlled at a pressure which is higher than the pressure in the surge tank 17, by a predetermined constant pressure. The fuel injector 18 is controlled by an electronic control unit 40, on the basis of signals output by an air flow meter 35 and a crank angle sensor 36. When the nozzle opening 19 is opened, fuel is injected into the combustion chamber 4 from the nozzle opening 19, and the amount of fuel injected by the fuel injector 18 is controlled by an injection time, i.e., an opening time of the nozzle opening 19.

Referring to FIG. 2, the two-stroke engine has two intake valves 6, and the fuel injector 18 is located at a position beneath and between the intake valves 6. The fuel injector 18 is arranged so as to inject fuel along the injection axis K parallel to a vertical plane P. The plane P is a vertical plane which contains centers $O_1$ and $O_2$ of the intake valve 6 and the exhaust valve 7, which are arranged on opposite sides with respect to the masking wall 8a. The injection axis K passes through the ignition plug 10 and the center point between a pair of intake valves 6. As shown in FIG. 1, the injection axis K meets the bottom face 3e of the cylinder head 3 at an angle of 30°.

Figure 5:
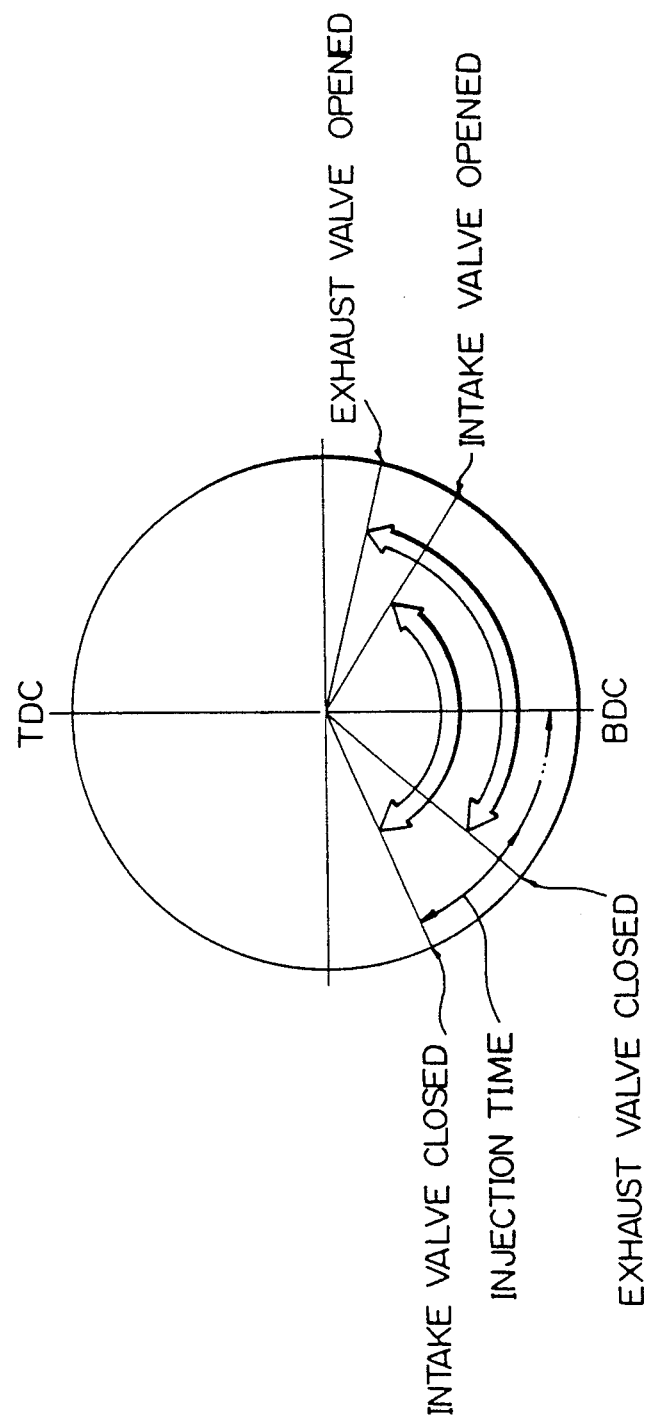
FIG. 5 is a diagram illustrating the opening and closing times of the intake valve and exhaust valve, and the fuel injection time.

FIG. 5 illustrates the opening and closing times of the intake valve 6 and the exhaust valve 7, and the injection time of the fuel injector 18. Referring to FIG. 5, the exhaust valves 7 open earlier than the intake valves 6, before BDC, and the exhaust valves 7 close earlier than the intake valves 6 after BDC. The fuel injector 18 starts the fuel injection immediately before the exhaust valves 7 close, and stops the fuel injection immediately before the intake valves 6 close.

Figure 6:
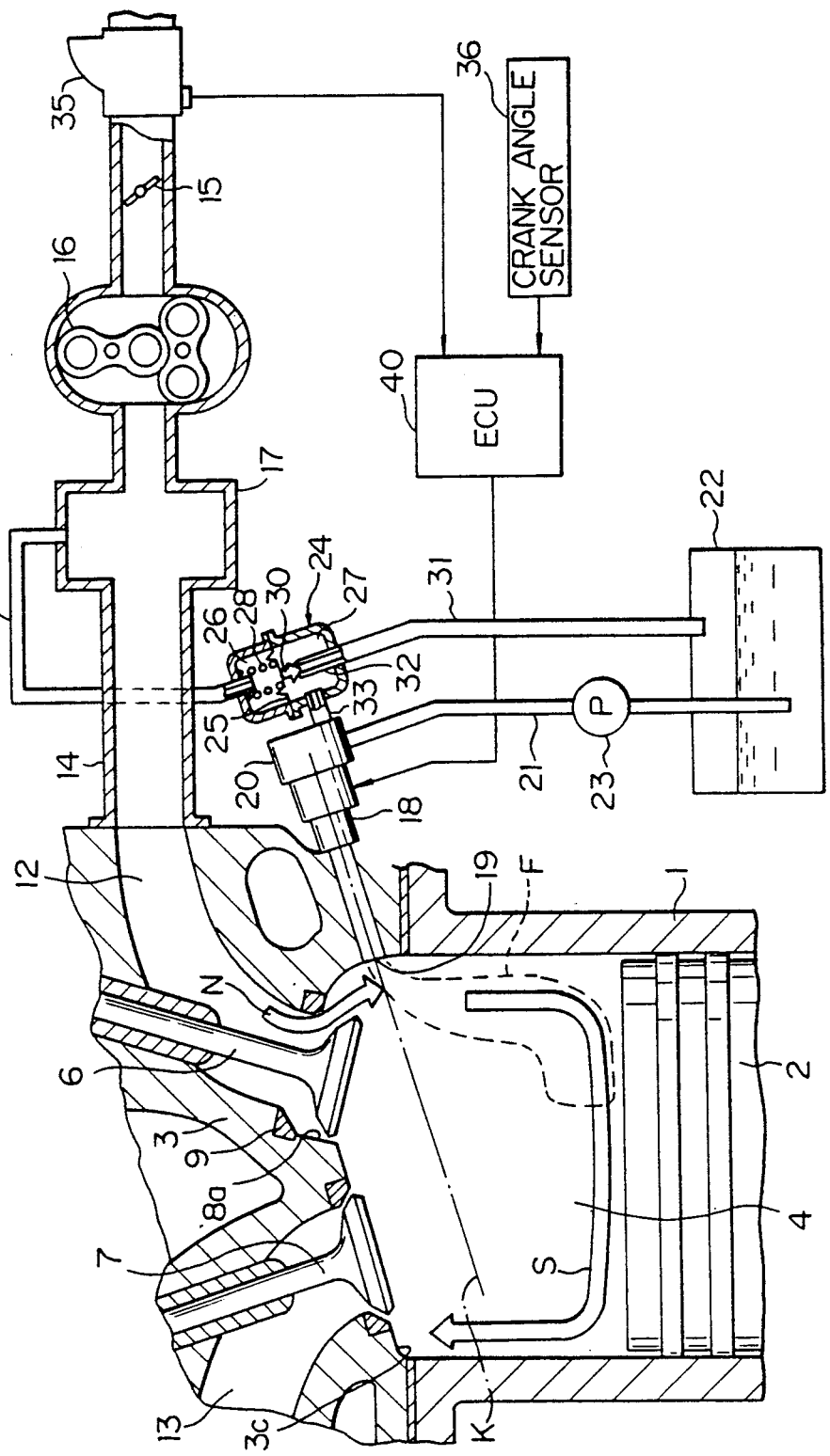
FIG. 6 is a cross-sectional side view of a two-stroke engine during the injection of fuel by the injector.

When the piston 2 moves downward and the exhaust valve 7 is opened, high pressure combustion gas in the combustion chamber 4 flows rapidly, to the exhaust port 13, and the pressure in the combustion chamber 4 is rapidly reduced. As shown in FIG. 6, when the intake valve 6 is opened, fresh air flows into the combustion chamber 4 from the intake port 12. At this time, since the masking walls 8a are provided for the valve openings of the intake valves 6, the fresh air flows mainly into the combustion chamber 4 from portions of the valve openings of the intake valve 6 as shown by an arrow N, which portions are located on the opposite side with respect to the masking walls 8a. Then, as illustrated by the arrow S, the fresh air moves downward along the inner face of the cylinder below the intake valves 6, crosses the top face of the piston 2, and then moves upward along the inner face of the cylinder below the exhaust valves 7. As a result, the combustion gas in the combustion chamber 4 is pushed out by the fresh air and discharged into the exhaust ports 13. When the displacement of the exhaust valves 7 becomes small, after BDC, the fresh air moving upward along the inner face of the cylinder down the exhaust valves 7 then moves along the inner face portion 3c of the cylinder head at which the exhaust valves 7 are arranged and toward the intake valves 6. Accordingly in the combustion chamber 4, a swirl is produced around an axis perpendicular to the cylinder axis, and high temperature combustion gas is collected at the center of the swirl, i.e., at the center of the combustion chamber 4. Then fuel is injected from the nozzle opening 19 of the fuel injector 18.

As shown in FIG. 6, the fuel injector 18 is arranged at an angle such that the injection axis K is directed toward the upper space in the combustion chamber 4, and fuel is injected from the nozzle opening 19 along the injection axis K. Since the fresh air flow N, which flows from the openings of the intake valves 6 into the combustion chamber 4, meets the injected fuel at an angle of about 90°, the injected fuel is sheared by the fresh air flow N, and thus the fuel is properly atomized. The fuel F atomized by the fresh air flow N is deflected to the bottom of the combustion chamber 4. Furthermore, the injected fuel is diffused in the combustion chamber 4 by the fresh air flow S, and is mixed with the high temperature combustion gas, and thus the fuel vaporization is improved. Then, although the exhaust valve is closed, fresh air continues to flow into the combustion chamber 4 from the openings of the intake valves. Accordingly, since a strong swirl is produced, the injected fuel is atomized and diffused in the combustion chamber 4, and thus the fuel vaporization is improved. The injected fuel is deflected to the bottom of the combustion chamber 4 by the fresh air flow along the inner face portion 3c of the cylinder head and toward the intake valves.

Then the fuel injection from the fuel injector 18 is stopped, and the intake valves are closed.

While the intake valves are open, since the surge tank 17 is communicated with the combustion chamber 4, the pressure in the surge tank, i.e., the scavenging pressure, becomes equal to the pressure in the combustion chamber 4. Also, for a short while after the intake valves 6 are closed, the pressure in the surge tank 17 is substantially equal to the pressure in the combustion chamber 4. The fuel injection is carried out at about BDC, and therefore, during the fuel injection, the pressure fluctuation in the combustion chamber 4 is small and the pressure in the surge tank 17 becomes substantially equal to the pressure in the combustion chamber 4.

The pressure regulator 24 controls the fuel pressure supplied to the fuel injector 18 to a pressure higher than the pressure in the surge tank 17, by a predetermined constant pressure. Accordingly, when fuel is injected from the fuel injector 18, the fuel pressure is controlled to a pressure higher than the pressure in the combustion chamber 4, by a predetermined constant pressure. Therefore, although fuel is injected from the fuel injector 18 during the fuel injection time calculated from an engine load and engine speed, the amount of injected fuel can be precisely controlled even if the pressure in the combustion chamber fluctuates.

In this embodiment, since the combustion gas in the combustion chamber 4 is not introduced into the spring chamber 26 of the pressure regulator 24, the spring chamber 26 is not contaminated by the combustion gas. During the combustion stroke, since the intake valves 6 are closed, the combustion pressure in the combustion chamber 4 is not introduced into the spring chamber 26. Accordingly, by a simple constitution, the fuel pressure during the fuel injection can be controlled to a pressure higher than the pressure in the combustion chamber 4, by a predetermined constant pressure.

In this embodiment, since fuel is injected from the fuel injector 18 to the combustion chamber 4 while the intake valves 6 are open, the injected fuel is atomized by the fresh air flow flowing into the combustion chamber 4 through the opening of the intake valves 6, and is deflected toward the bottom of the combustion chamber 4. Therefore, injected fuel is diffused in the combustion chamber 4 by a fresh air flow S, and is mixed with high temperature combustion gas, and thus a quicker fuel vaporization is obtained due to the high temperature combustion gas. Accordingly, the fuel is easily ignited and a good combustion is obtained. Since a fuel mist F is deflected downward by the fresh air flow S, fuel does not flow out of the exhaust port 13 even if the fuel injector 18 starts an injection before the exhaust valves 7 are closed.

The injection timing of the fuel injector 18 may be advanced, as long as fuel does not flow out of the exhaust port 13. For example, as shown by a phantom line in FIG. 5, the fuel injector may start a fuel injection immediately after BDC.

Also, the fuel injector 18 may start an injection after the exhaust valves are closed.

Since the pressure in the surge tank 17 is substantially equal to the pressure in the combustion chamber 4, for a short while after the intake valves 6 are closed, the fuel injector 18 may stop the fuel injection after the intake valves are closed. Namely, the fuel injector 18 may inject fuel while the pressure in the surge tank 17 is substantially equal to the pressure in the combustion chamber 4, after the intake valves are closed.

The timing of the start of the fuel injection of the fuel injector 18 may be fixed, or may be based on the engine speed and engine load.

A second embodiment of the present invention is now described with reference to FIGS. 7 and 8, wherein 101 designates a cylinder block, 102 a piston, 103 a cylinder head, 104 a combustion chamber, 105 a pair of intake valves, and 106 a pair of exhaust valves. Masking walls 107 are arranged as close as possible to the peripheral portions of the corresponding intake valves 105 and extend in an arc along the periphery of the corresponding intake valves 105. The valve opening between the valve seat and the peripheral portion of the intake valve 105, which is located on the exhaust valve side, is masked by the corresponding masking wall 107 for the entire time for which the intake valve 105 is open. A spark plug 108 is arranged at the center of the inner wall 103a of the cylinder head 103, and intake ports 109 are formed in the cylinder head 103 for the intake valves 105 and exhaust ports 110 formed in the cylinder head 103 for the exhaust valves 106.

Figure 7:
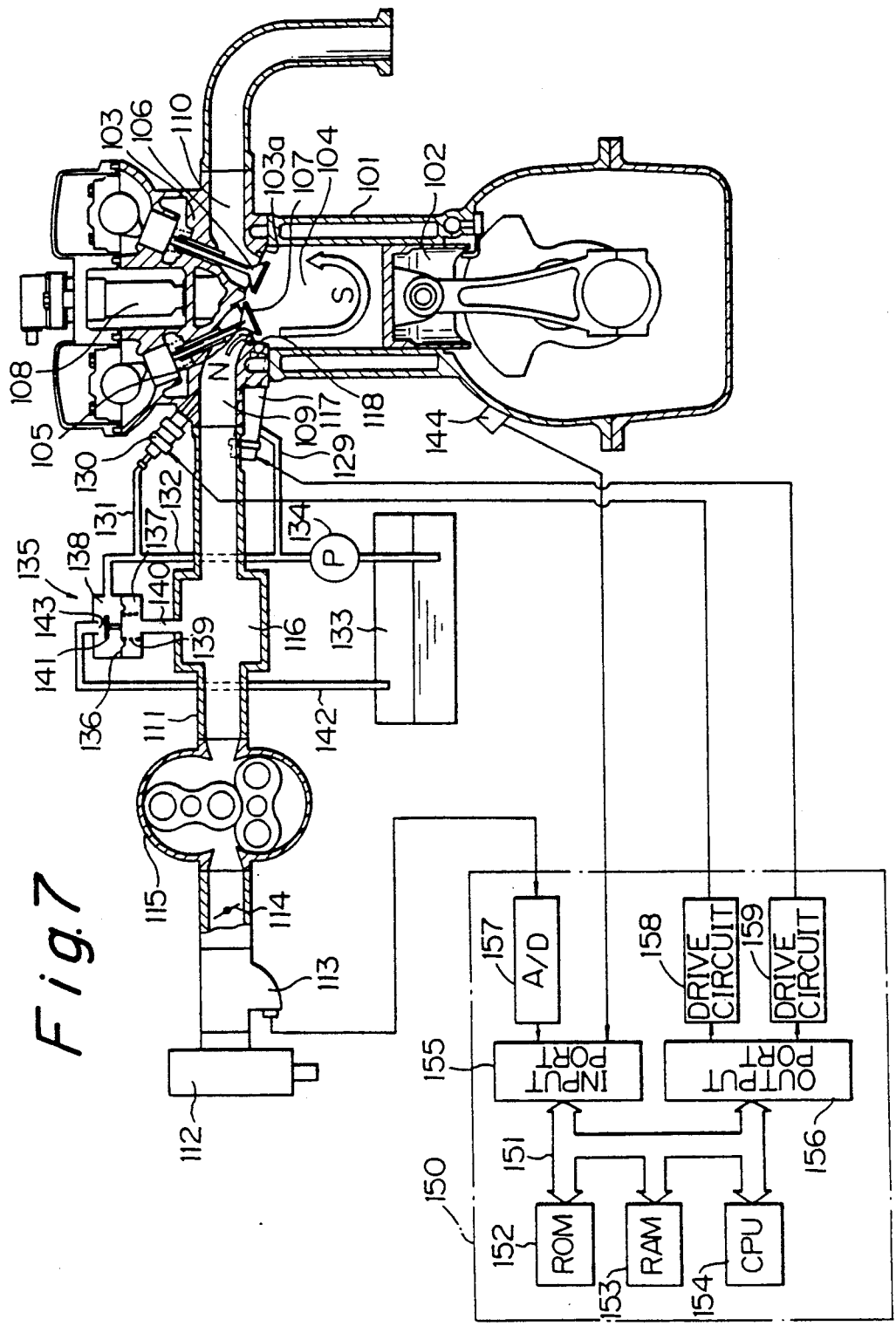
FIG. 7 is an overall view of a two-stroke engine of a second embodiment according to the present invention.

Referring to FIG. 7, the intake ports 109 are connected to an air cleaner 112 via an intake pipe 111, and an air flow meter 113, a throttle valve 114, a mechanically driven supercharger 115, and a surge tank 116 are arranged in the intake pipe 111 in this order from an upstream side thereof. A first fuel injector 117 is arranged at the peripheral portion of the inner wall portion 103a of the cylinder head 103, below the intake valves 105, and a nozzle opening 118 thereof is formed at the tip of the first fuel injector 117 and is located in the combustion chamber 104.

The first fuel injector 117 is described with reference to FIG. 9, wherein a straight needle insertion bore 120 is formed in the housing 119 of the first fuel injector 117, and a needle 121 having a diameter smaller than that of the needle insertion bore 120 is inserted to the needle insertion bore 120. A nozzle opening 118 is formed at one end of the needle insertion bore 120, and the nozzle opening 118 is opened and closed by the valve head 122 formed on the tip of the needle 121. A fuel inlet passage 129 is communicated with and allows a flow of fuel to the needle insertion bore 120. A spring retainer 123 is mounted on the needle 121, and a compression spring 124 is inserted between the spring retainer 123 and the housing 119. The nozzle opening 118 is normally closed by the valve head 122 of the needle 121, due to the spring force of the compression spring 124. A movable core 125 is constantly urged against the end portion of the needle 121, which is positioned opposite to the valve head 122, by the spring force of the compression spring 126, and a solenoid 127 and a stator 128 are arranged in the housing 119 to attract the movable core 125. When the solenoid 127 is energized, the movable core 125 is moved toward the stator 128, and at this time, since the needle 121 has been moved toward the nozzle opening 118 against the force of the compression spring 124, the nozzle opening 118 is opened. The fuel injected from the nozzle opening 118 has a spread angle of 60 degrees, and the diameter of the nozzle opening 118 of the first fuel injector 117 is determined such that the amount of fuel to be injected in an idle running state can be precisely injected. Accordingly, when the amount of fuel to be injected is too large, i.e., when the engine load is high, since the fuel injection time is prolonged, the fuel injection cannot be carried out during a required period.

As shown in FIGS. 7 and 8, a second fuel injector 130 is arranged at one of the intake ports 109, and fuel having a small spread angle is injected from the second fuel injector 130 to the intake port 109. The second fuel injector 130 injects fuel toward a valve head of the intake valve 105, and the injected fuel impinges on the valve head of the intake valve 105, and thus is atomized.

The fuel inlet passage 129 and a fuel inlet passage 131, which is connected to the second fuel injector 130, are connected to a fuel tank 133 via a fuel supply passage 132, a fuel supply pump 134 is arranged in the fuel supply passage 132, and an pressure regulator 135 is arranged at one end of the fuel supply passage 132. The pressure regulator 135 comprises a spring chamber 137 and a fuel chamber 138, which are defined by a diaphragm 136, and a compression spring 139, which forcibly moves the diaphragm 136, is arranged in the spring chamber 137. The spring chamber 137 is connected to the surge tank 116 via a pressure conduit 140, and thus the pressure in the surge tank 116 is introduced into the spring chamber 137. The fuel chamber 138 is connected to the fuel supply passage 132, and thus fuel is introduced into the fuel chamber 138. A valve body 141, which extends into the fuel chamber 138, is arranged at the center of the diaphragm 136, and a fuel return conduit 142, which connects the fuel chamber 138 to the fuel tank 133, protrudes into the fuel chamber 138. The opening 143 of the fuel return conduit 142 in the fuel chamber 138 is opened and closed by the valve body 141. The opening 143 is opened when the fuel pressure in the fuel chamber 138 becomes higher than the pressure in the spring chamber 137, by a predetermined pressure of, for example, 5 atmospheres, and fuel in the fuel chamber 138 is returned to the fuel tank 133. Therefore, the fuel pressure supplied to the first and second fuel injectors 117 and 130 is controlled to a pressure higher than the pressure in the surge tank 116, by a predetermined constant pressure. The first and second fuel injectors 117 and 130 are controlled by an electronic control unit 150, on the basis of signals output by the air flow meter 113 and a crank angle sensor 144.

Referring to FIG. 8, the first fuel injector 117 is arranged so as to inject fuel along the injection axis K parallel to a vertical plane P. The plane P is a vertical plane which contains centers $O_1$ and $O_2$ of the intake 105 and the exhaust valve 106, which are arranged on opposite sides of the masking wall 107a. The injection axis K passes through the ignition plug 108 and a center point between a pair of intake valves 105.

The electronic control unit 150 is constructed as a digital computer and comprises a ROM (read only memory) 152, a RAM (random access memory) 153, a CPU (microprocessor, etc.) 154, an input port 155, and an output port 156. The ROM 152, the RAM 153, the CPU 154, the input port 155, and the output port 156 are interconnected by a bidirectional bus 151.

The air flow meter 113 is connected to the input port 155 via an AD converter 157, and the crank angle sensor 144 producing output pulses having a frequency proportional to the engine speed is connected to the input port 155.

The output port 156 is connected to the first and second fuel injectors 117 and 130, through corresponding drive circuits 159 and 158.

Figure 11:
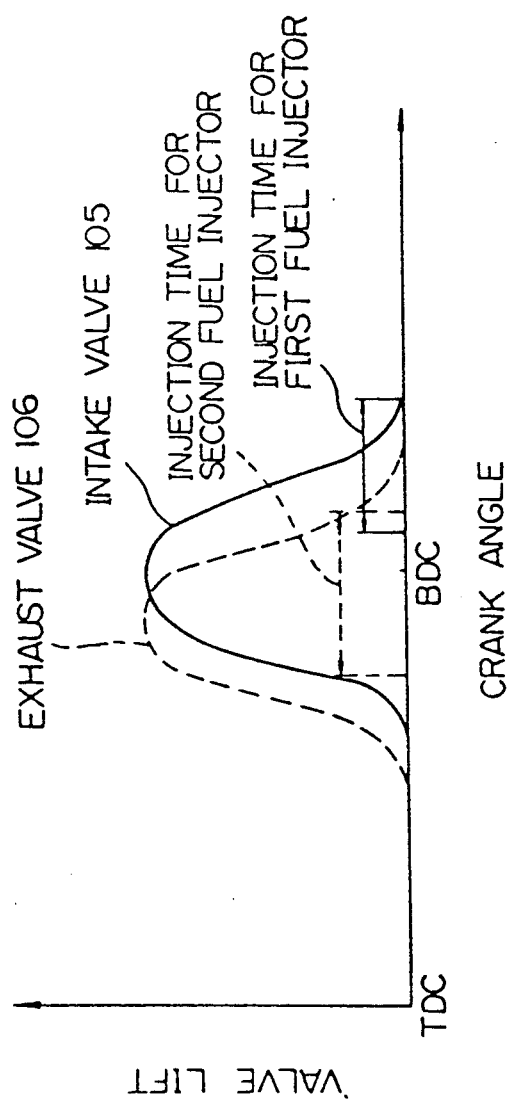

FIGS. 10 and 11 illustrate the opening times of the intake valve 105 and the exhaust valve 106, and the injection times of the fuel injectors 117 and 130. Referring to FIGS. 10 and 11, the exhaust valves 106 open earlier than the intake valves 105, before BDC, and the exhaust valves 106 close earlier than the intake valves 105, after BDC. When the amount of fuel to be injected is less than a predetermined amount, fuel is injected from only the first fuel injector 117. The first fuel injector 117 injects fuel during the time from a latter half of a scavenging stroke to the closing of the intake valve 105. Note, the first fuel injector 117 may inject fuel immediately after the intake valve 105 is closed.

When the piston 102 moves downward and the exhaust valve 106 is opened, high pressure combustion gas in the combustion chamber 104 flows rapidly to the exhaust port 110, and the pressure in the combustion chamber 104 is rapidly reduced. As shown in FIG. 7, when the intake valve 105 is opened, fresh air flows into the combustion chamber 104 from the intake port 109. At this time, since the masking walls 107 are provided for the valve openings of the intake valves 105, the fresh air flows mainly into the combustion chamber 104 from portions of the valve openings of the intake valves 105, as shown by an arrow N, which portions are located on opposite sides of the masking walls 107. Then, as illustrated by the arrow S, the fresh air moves downward along the inner face of the cylinder below the intake valves 6, crosses the top face of the piston 102, and then moves upward along the inner face of the cylinder below the exhaust valves 106, and as a result, the combustion gas in the combustion chamber 104 is pushed out by the fresh air. When the displacement of the exhaust valves 106 becomes small, after BDC, the fresh air moving upward along the inner face of the cylinder below the exhaust valves 106, moves along the inner face portion 103a of the cylinder head at which the exhaust valves 106 are arranged and toward the intake valves 105. Accordingly, in the combustion chamber 104, a swirl is produced around the axis thereof perpendicular to the cylinder axis, and a high temperature combustion gas is collected at the center of the swirl, i.e., at the center of the combustion chamber 104. Then fuel is injected from the nozzle opening 118 of the first fuel injector 117.

Figure 12:
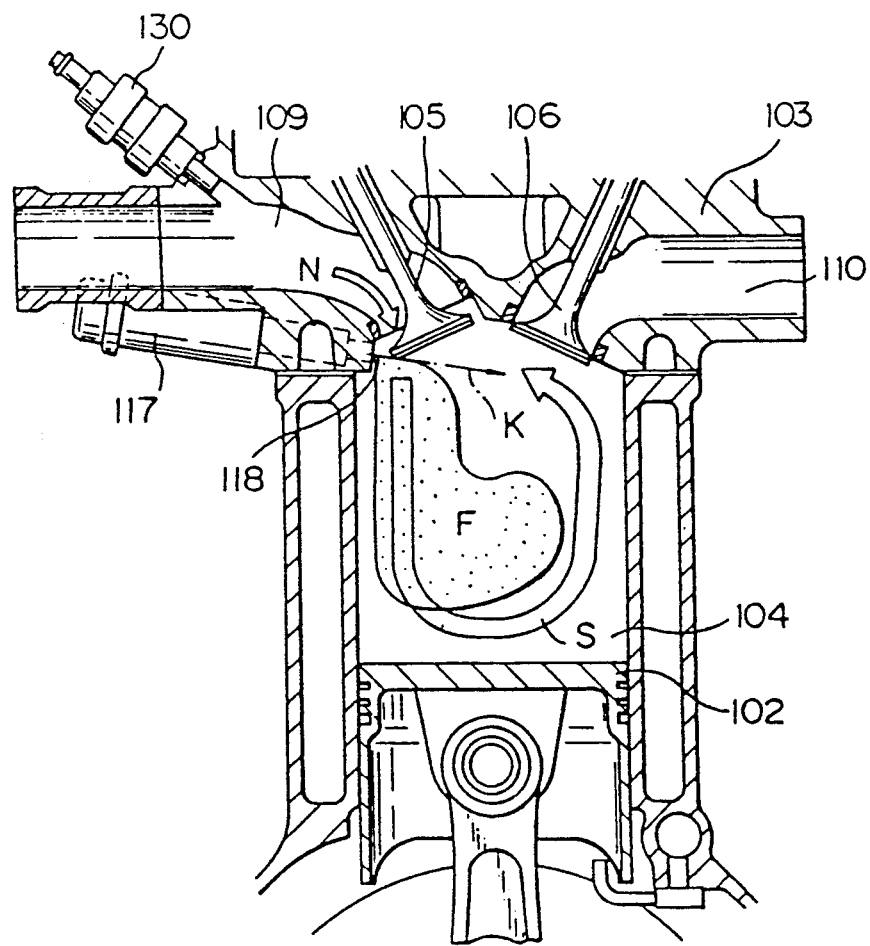
FIG. 12 is a cross-sectional side view of a two-stroke engine of the second embodiment during an injection of fuel by the first fuel injector.

As shown in FIG. 12, the first fuel injector 117 is arranged at a downward angle such that the injection axis K is directed toward the upper space in the combustion chamber 104, and fuel injected from the nozzle opening 118 along the injection axis K has a spread angle of 60 degrees. Since the fresh air flow N, which flows from the opening of the intake valves 105 into the combustion chamber 104, meets the injected fuel at an angle of about 90°, the injected fuel is sheared by the fresh air flow N, and thus the fuel is properly atomized. The atomized fuel F is deflected to the bottom of the combustion chamber 104 by the fresh air flow N. Furthermore, the injected fuel is diffused in the combustion chamber 104 by the fresh air flow S and is mixed with the high temperature combustion gas, and thus the fuel vaporization is improved. Then, although the exhaust valve is closed, fresh air continues to flow into the combustion chamber 104 from the openings of the intake valves 105, and accordingly, since a strong swirl is produced, the injected fuel is atomized and diffused in the combustion chamber 104, and thus the fuel vaporization is further improved. The injected fuel is deflected to the bottom of the combustion chamber 104 by the fresh air flowing along the inner face portion 103a of the cylinder head and toward the intake valves 105. Then, when the fuel injection time has elapsed, the first fuel injector 117 is closed, i.e., the fuel injection from the first fuel injector 117 is stopped, and the intake valves are closed.

Accordingly, since fuel is injected from the first fuel injector 117 to the combustion chamber 104 while the intake valves are open, the injected fuel is atomized by the fresh air flow and is deflected toward the bottom of the combustion chamber 104. Therefore, injected fuel is diffused in the combustion chamber 104 by the fresh air flow S and is mixed with the high temperature combustion gas, and thus the fuel is quickly vaporized by the high temperature combustion gas. Accordingly, the fuel is easily ignited and a good combustion is obtained. Since the fuel mist F is deflected downward by the fresh air flow S, fuel does not flow out of the exhaust port 110, even if the first fuel injector 117 starts to inject fuel before the exhaust valves 106 are closed.

While the intake valves 105 are open, since the surge tank 116 is communicated with the combustion chamber 104, the pressure in the surge tank 116 becomes equal to the pressure in the combustion chamber 104. Also, the pressure regulator 135 controls the fuel pressure supplied to the first fuel injector 117 to a pressure higher than the pressure in the surge tank 116, by the predetermined constant pressure, and accordingly, when fuel is injected from the first fuel injector 117, the fuel pressure is controlled to a pressure higher than the pressure in the combustion chamber 104, by a predetermined constant pressure. Therefore, although fuel is injected from the first fuel injector 117 during the fuel injection time calculated from the engine load and engine speed, the amount of fuel injected can be precisely controlled even if the pressure in the combustion chamber fluctuates.

When the amount of fuel to be injected becomes larger than a predetermined amount of fuel, if fuel is injected from only the first fuel injector 117, the fuel injection time becomes too long, and therefore, fuel is injected from the first and second fuel injector 117 and 130. The second fuel injector 130 injects fuel during the scavenging stroke, as shown in FIGS. 10 and 11. Fuel injected from the second fuel injector 130 impinges on the valve head of the intake valve 105, and is atomized by a fresh air flow, and the atomized fuel flows into the combustion chamber 104 with the fresh air and is diffused in the combustion chamber 104. Then fuel is injected from the first fuel injector 117, as mentioned above, and accordingly, when an engine is run under a high load condition, i.e., when the amount of fuel to be injected is large, fuel is injected from the first and second fuel injectors 117 and 130, and thus a good combustion is obtained. Since the swirl S is produced in the combustion chamber 104, the fresh air from the open intake valves 105 does not flow directly to the exhaust port 110, and the amount of fuel injected from the second fuel injector 130 is a part of all of the amount of fuel to be injected and is small. Therefore, a very small amount of fuel injected from the second fuel injector 130 flows to the exhaust port 110.

Figure 13:
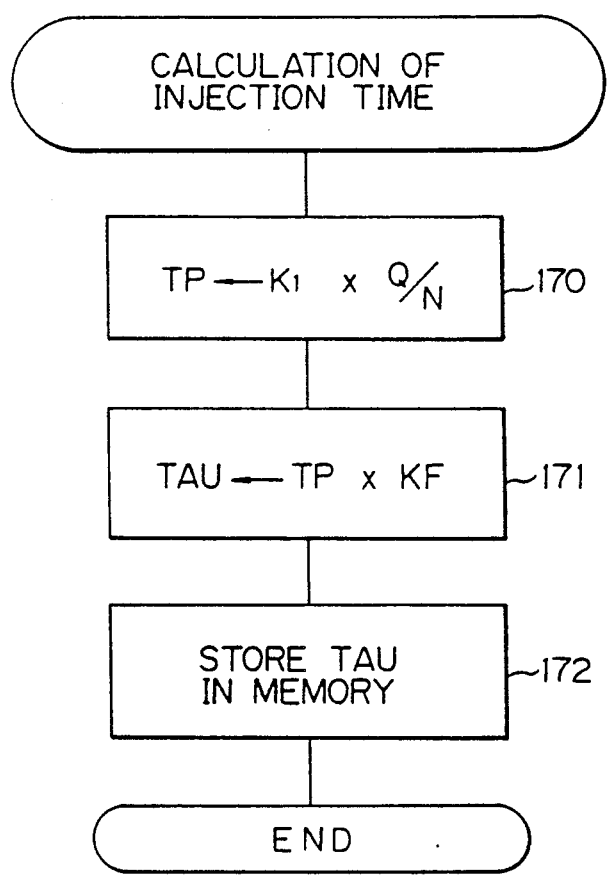
FIG. 13 is a flow chart for executing the calculation of the injection time TAU.

FIG. 13 illustrates a routine for calculating a fuel injection time. This routine is processed at a predetermined crank angle.

Referring to FIG. 13, in step 170, the basic injection time TP is calculated from the engine speed N and the amount of the air Q fed into the engine cylinder. This basic injection time TP designates a basic injection time of the first fuel injector 117. In this step, $K_1$ indicates a constant value. Then, in step 171, the actual injection time TAU is calculated from the following equation.

$$TAU = TP \times KF$$

Where KF indicates a correction coefficient based on the cooling water temperature and air temperature. Then, in step 172, the actual injection time is stored in a memory.

Figure 14:
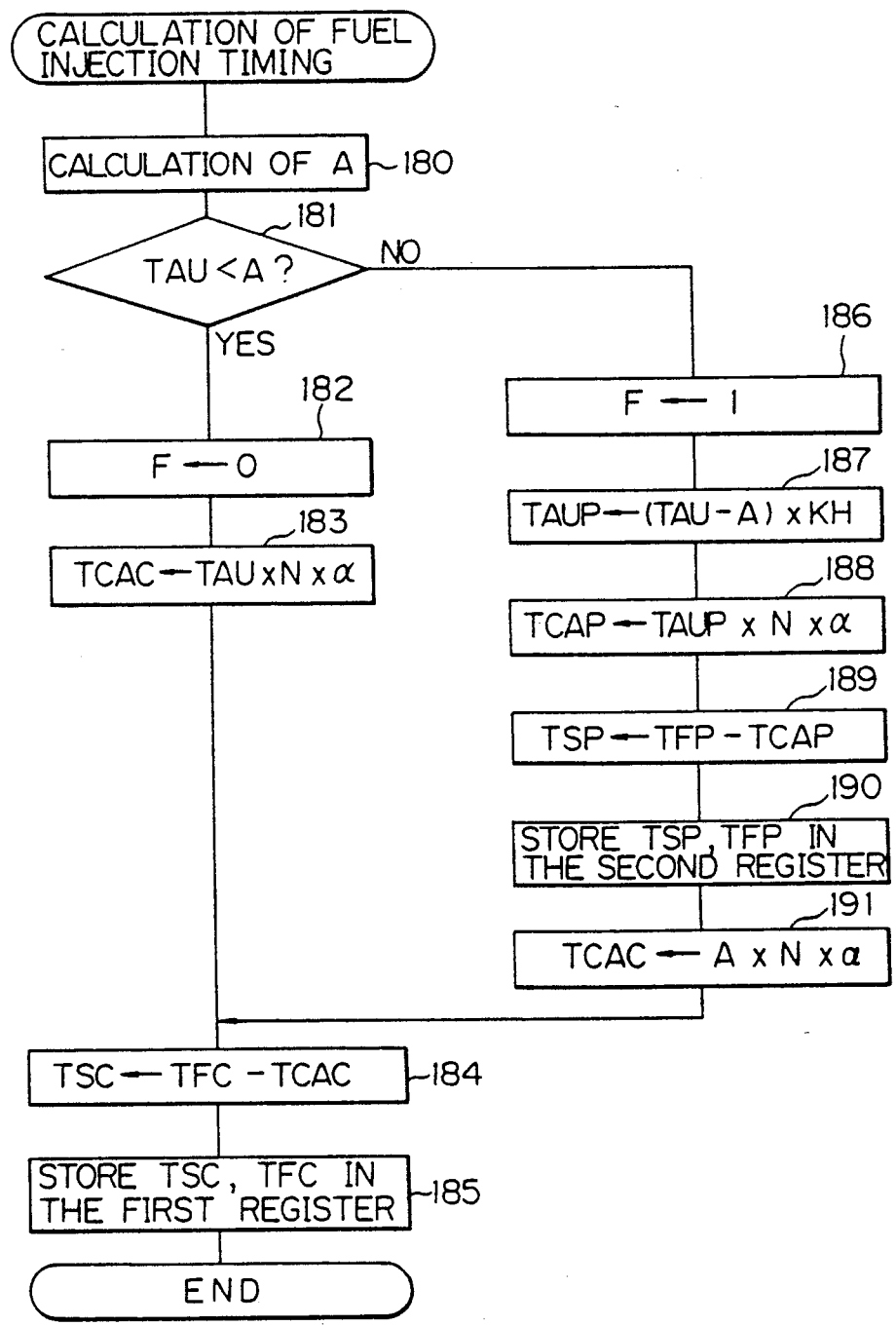
FIG. 14 is a flow chart for executing the calculation of the fuel injection timing.

FIG. 14 illustrates a routine for calculating a fuel injection timing. This routine is processed by sequential interruptions executed at a predetermined crank angle.

Figure 15:
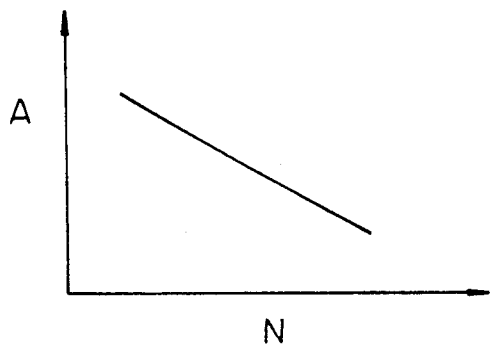
FIG. 15 illustrates the relationship between the engine speed N and the standard injection time A.

Referring to FIG. 14, in step 180, a standard injection time A is calculated. The standard injection time A indicates an appropriate injection time for the first fuel injector 117, i.e., a time from a latter half of a scavenging time to the timing at which the intake valve 105 is closed. For example, the standard injection time A corresponds to a rotation of the crankshaft through an angle of 50°. Accordingly, as shown in FIG. 15, the standard injection time A is shortened by an increase of the engine speed N. In step 181, it is determined whether or not the actual injection time TAU is smaller than the standard time A. When TAU<A, the routine goes to step 182. In step 182, a flag F is reset, and in step 183, the actual injection time TAU is converted to an injection crank angle TCAC, by the following equation.

$$TCAC = TAU \times N \times a$$

Where N is a engine speed, $a$ is a conversion coefficient. In step 184, an injection start crank angle TSC (see FIG. 10) of the first fuel injector 117 is calculated by the following equation.

$$TSC = TFC - TCAC$$

Where TFC (see FIG. 10) is a stop crank angle of the first fuel injector 117 and is a fixed value. Then, in step 185, TSC and TFC are stored in a first register. In step 181, when TAU≧A, the routine goes to step 186 and the flag F is set. In step 187, an injection time TAUP of the second fuel injector 130 is calculated by the following equation.

$$TAUP = (TAU - A) \times KH$$

Where KH is a coefficient which converts an injection time of the first fuel injector 117 to an injection time of the second fuel injector 130. In step 188, the injection time TAUP of the second fuel injector 130 is converted to an injection crank angle TCAP of the second fuel injector 130, by the following equation.

$$TCAP = TAUP \times N \times a$$

In step 189, an injection start crank angle TSP (see FIG. 10) of the second fuel injector 130 is calculated by the following equation.

$$TSP = TFP - TCAP$$

Where TFP (see FIG. 10) is a stop crank angle of the second fuel injector 130, and is a fixed value. Then, in step 190, TSP and TFP are stored in a second register. Then, in step 191, the standard injection time A is converted to the injection crank angle TCAC of the first fuel injector 117, by the following equation.

$$TCAC = A \times N \times a$$

Then, in step 184, TSC is calculated, and in step 185, TSC and TFC are stored in the first register.

Figure 16:
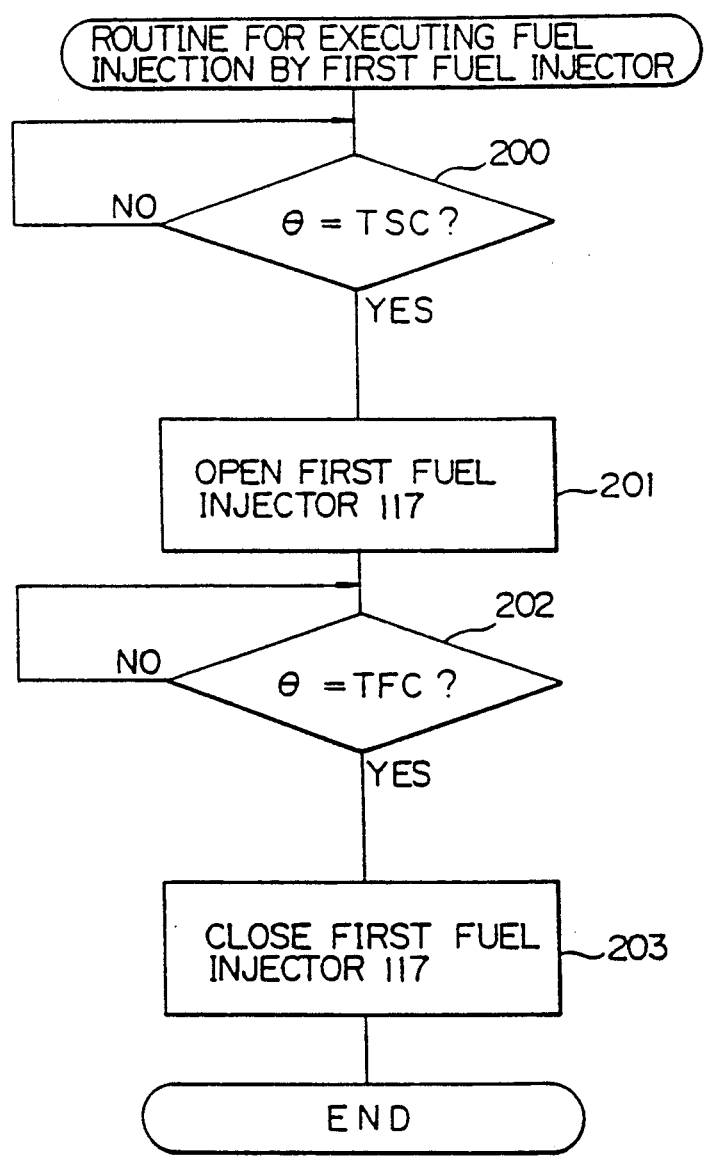
FIG. 16 is a flow chart for executing the fuel injection by the first fuel injector.

FIG. 16 illustrates a routine for executing a fuel injection by the first fuel injector 117. This routine is processed at a predetermined crank angle. Referring to FIG. 16, in step 200, it is determined whether or not a crank angle $\theta$ is the injection start crank angle TSC (see FIG. 10) of the first fuel injector 117. When $\theta = TSC$, the routine goes to step 201 and the first fuel injector 117 is opened and the fuel injection is started. In step 202, it is determined whether or not the crank angle $\theta$ is the injection step crank angle TFC (see FIG. 10) of the first fuel injector 117. When $\theta = TFC$, the routine goes to step 203 and the first fuel injector 117 is closed and the fuel injection is stopped.

Figure 17:
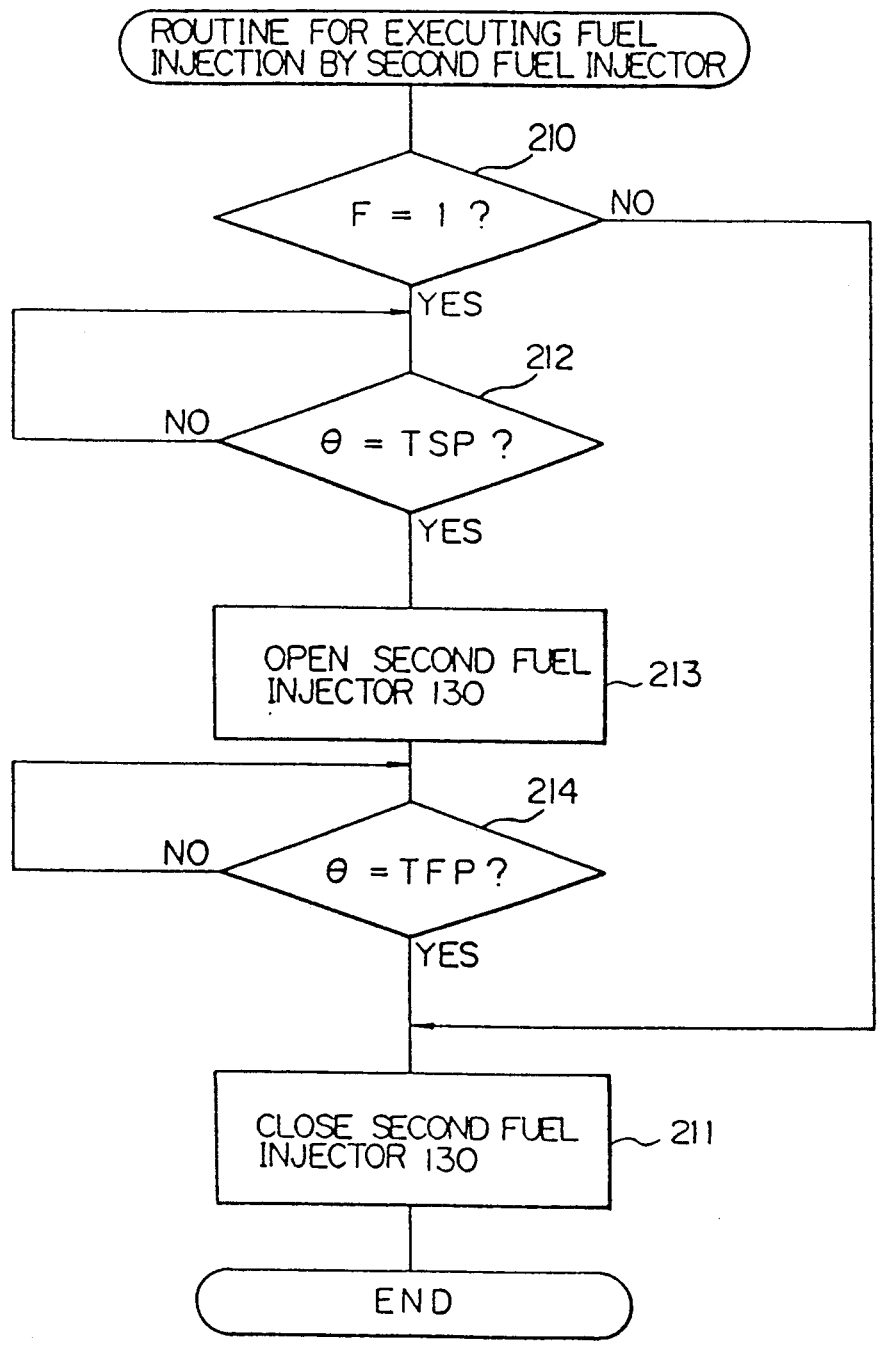
FIG. 17 is a flow chart for executing the fuel injection by the second fuel injector.

FIG. 17 illustrates a routine for executing a fuel injection by the second fuel injector 130. This routine is processed at a predetermined crank angle. Referring to FIG. 17, in step 210, it is determined whether or not the flag F is set. When F=0, i.e., when an injection by the second fuel injector 130 is not required, the routine goes to step 211 and the second fuel injector 130 is closed. In step 210, when F=1, i.e., when a fuel injection by the second fuel injector 130 is required, the routine goes to step 212 and it is determined whether or not the crank angle $\theta$ is equal to the injection start crank angle TSP (see FIG. 10) of the second fuel injector 130. When $\theta = TSP$, the routine goes to step 213 and the second fuel injector 230 is opened and the fuel injection to the intake port is started. In step 214, it is determined whether or not the crank angle $\theta$ is the stop crank angle TFP (see FIG. 10) of the second fuel injector 130. When $\theta = TFP$, the routine goes to step 211 and the second fuel injector 130 is closed and the fuel injection is stopped.

Figure 18:
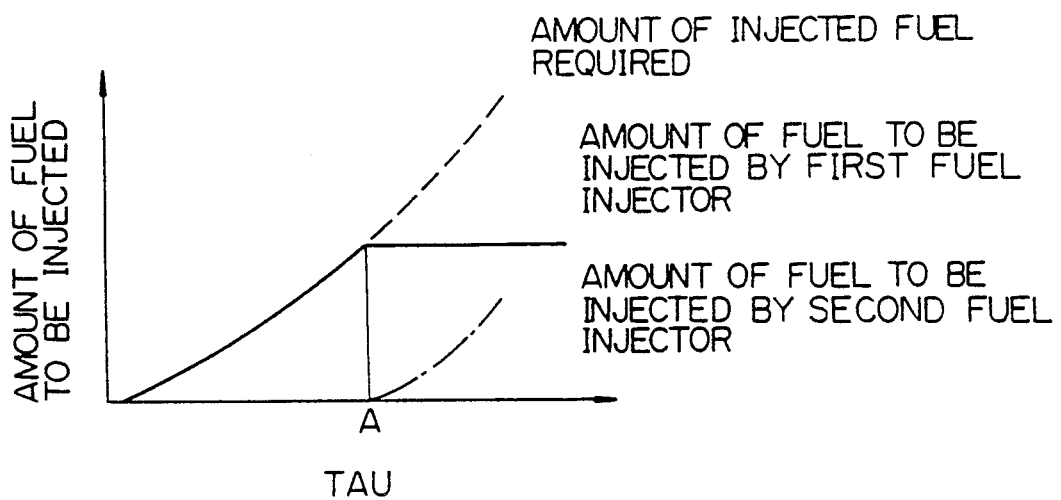
FIG. 18 illustrates the relationship between the amount of fuel injected from the first fuel injector and the amount of fuel injected from the second fuel injector.

When fuel cannot be injected from the first fuel injector 117 during an appropriate time, because the amount of fuel to be injected is increased, fuel is injected from the first and second fuel injectors 117 and 130, and therefore, fuel can be injected during the appropriate time. Referring to FIG. 18, when the calculated actual injection time TAU is longer than the predetermined standard injection time A, the amount of fuel injected by the first fuel injector 117 becomes constant, as shown by the solid line, and the fuel injection from the second fuel injector 130 is started as shown by the phantom line.

The amount of fuel injected from the second fuel injector 130 to the intake port 109 is a part of all of the amount of fuel to be injected, and thus the amount of fuel flowing to the exhaust port 110 can be reduced.

Since the scavenging time becomes longer in accordance with a reduction of the engine speed, fuel injected to the intake port 109 easily flows to the exhaust port 110. In this embodiment, however, since the standard injection time A is increased in accordance with the reduction of the engine speed, i.e., the amount of fuel injected from the second fuel injector 130 is reduced in accordance with the reduction of the engine speed, the amount of fuel flowing to the exhaust port 110 can be reduced even under a high load and low engine speed condition. On the other hand, when the engine speed is high, although the amount of fuel injected from the second fuel injector 130 is increased, since the scavenging time is shortened when the engine speed is high, the amount of fuel flowing to the exhaust port 110 is reduced.

Since the fuel pressure supplied to the first fuel injector 117 is relatively low, if the temperature of the first fuel injector 117 becomes high, much vapor is generated in the fuel and a fuel injection becomes difficult. In this embodiment, however, since the first fuel injector 117 always injects fuel at a predetermined crank angle, the first fuel injector 117 is cooled thereby, and accordingly, the generation of vapor in the fuel is prevented and the fuel injection is facilitated. On the other hand, since the second fuel injector 130 does not inject fuel when the amount of fuel to be injected is small, the second fuel injector 130 is not cooled when the second injector 130 does not carry out a fuel injection. Nevertheless, since the second fuel injector 130 is arranged at the intake port 109, the temperature of the second fuel injector 130 is relatively low, and thus vapor is not generated in the fuel.

Note, it can be considered that two fuel injectors for injecting fuel to the same combustion chamber are arranged at one cylinder, and one fuel injector is operated when the amount of fuel to be injected is small, and two fuel injectors are operated when the amount of fuel to be injected is large. In this case, however, since two nozzle openings must be arranged in one combustion chamber, the assembly becomes difficult. In this embodiment, however, since only one nozzle opening is arranged in one combustion chamber, the assembly is relatively easy.

Note, in this embodiment, although a fuel injector having a small injection angle is used as the second fuel injector, a fuel injector having a large injection angle may be used instead.

Also, in this embodiment, although the standard injection time A is variable in accordance with an engine speed, it may be a fixed value such that the first fuel injector 117 is opened at an appropriate crank angle even under a maximum engine speed condition.

While the invention has been described with reference to specific embodiments chosen for purposes of illustration, it should be apparent that numerous modifications could be made thereto by those skilled in the art without departing from the basic concept and scope of the invention.

We claim:

1. A two-stroke engine having a cylinder, an intake valve and an exhaust valve arranged on an inner wall of a cylinder head and an intake passage connected to the cylinder via the intake valve, a pressure in the cylinder being lower than a scavenging pressure in the intake passage during a first portion of an opening period during which the intake valve is open and the pressure in the cylinder being substantially equal to the scavenging pressure in the intake passage during a latter portion of the opening period, said two-stroke engine comprising:
fuel injection means arranged in the cylinder for injecting fuel into the cylinder;
a pressure regulator for regulating a fuel pressure supplied to said fuel injection means on the basis of the scavenging pressure in the intake passage to thereby increase said fuel pressure in accordance with an increase of the scavenging pressure; and
control means for controlling said fuel injection means to inject fuel into the cylinder during the latter portion of the opening period.

2. A two-stroke engine according to claim 1, wherein the cylinder head comprises a masking wall arranged between said intake valve and said exhaust valve, to mask a valve opening formed between a valve seat and a peripheral portion of said intake valve, which is located on said exhaust valve side.

3. A two-stroke engine according to claim 2, wherein said masking wall masks said valve opening for the entire time for which said intake valve is open.

4. A two-stroke engine according to claim 3, wherein said fuel injection means and said masking wall are located on opposite sides of said intake valve, and a nozzle opening of said fuel injection means is located beneath the intake valve.

5. A two-stroke engine according to claim 4, wherein said engine has two intake valves and said fuel injection means is located beneath and between said intake valves.

6. A two-stroke engine according to claim 1, wherein a supercharger is arranged in said intake passage.

7. A two-stroke engine according to claim 1, wherein said pressure regulator regulates the fuel pressure to maintain said fuel pressure at a pressure higher than said scavenging pressure, by a predetermined value.

8. A two-stroke engine according to claim 7, wherein said pressure regulator comprises a diaphragm, a chamber defined by said diaphragm and connected to said intake passage, and a control valve operated by said diaphragm to control an amount of fuel to be returned.

9. A two-stroke engine according to claim 1, wherein a surge tank is arranged in said intake passage, and said scavenging pressure represents a pressure in said surge tank.

10. A two-stroke engine according to claim 1, wherein said control means controls the injection timing of said fuel injection means in accordance with an engine running condition.

11. A two-stroke engine according to claim 1, wherein an additional fuel injector is arranged in an intake port, and said pressure regulator regulates a fuel pressure supplied to said additional fuel injector on the basis of said scavenging pressure in said intake passage, to increase said fuel pressure supplied to said additional fuel injector in accordance with an increase of said scavenging pressure.

12. A two-stroke engine according to claim 11, wherein said pressure regulator regulates the fuel pressure supplied to said additional fuel injector to maintain the fuel pressure supplied to said additional fuel injector at a pressure higher than said scavenging pressure, by a predetermined value.

13. A two-stroke engine according to claim 11, wherein fuel is injected from only said fuel injection means when the amount of fuel to be injected is less than a predetermined amount of fuel, and fuel is injected from said fuel injection means and said additional fuel injector when the amount of fuel to be injected is more than said predetermined amount of fuel.

14. A two-stroke engine according to claim 13, wherein said predetermined amount of fuel is reduced in accordance with an increase of an engine speed.

15. A two-stroke engine according to claim 11, wherein fuel is injected from said additional fuel injector before fuel is injected from said fuel injection means.

* * * * *